No. 890,185. PATENTED JUNE 9, 1908.
W. H. SELLS.
CORN HUSKING MACHINE.
APPLICATION FILED JAN. 20, 1906.
2 SHEETS—SHEET 2.
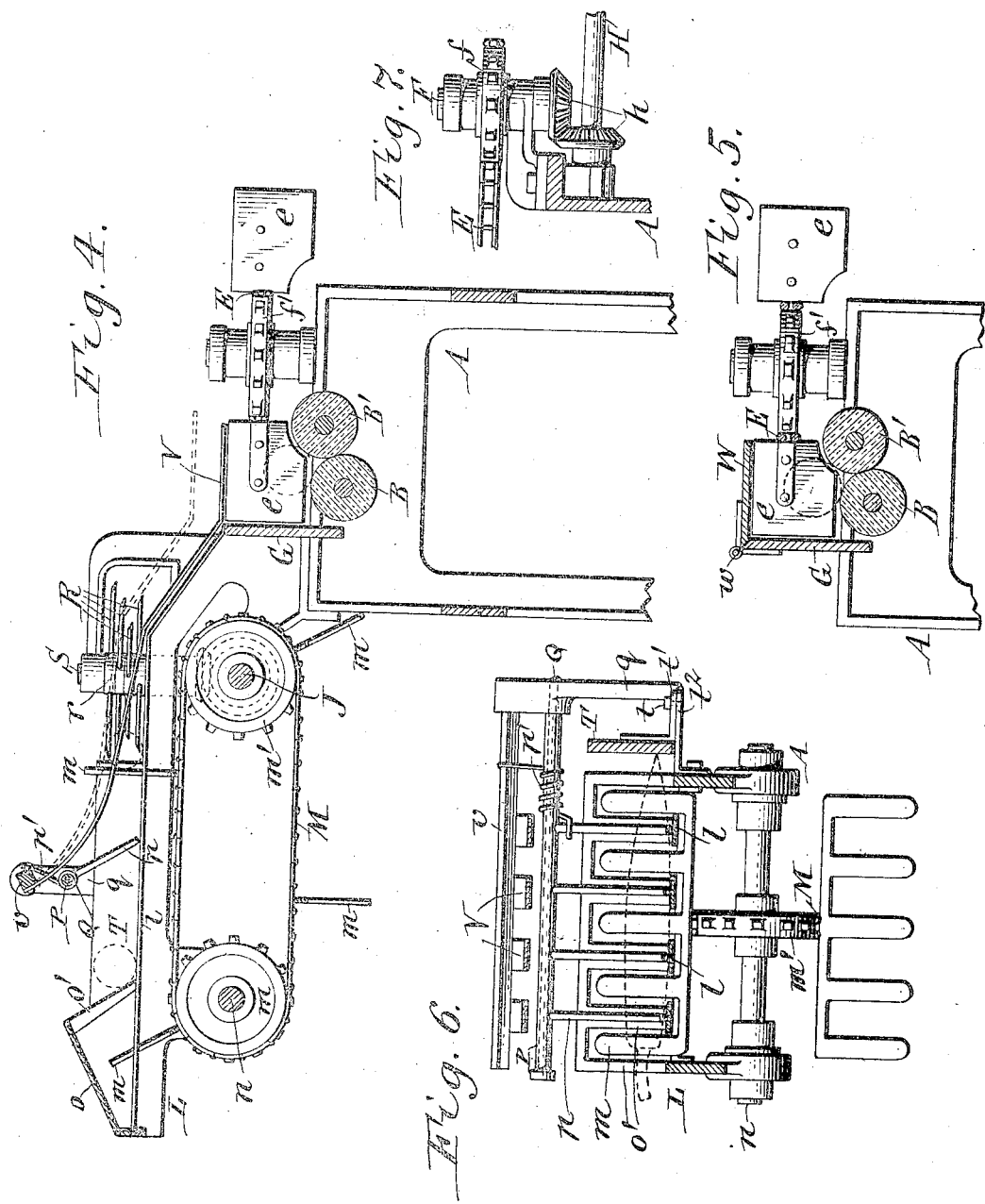
Witnesses:
Louis W. Gratz,
Emma M. Graham
William H. Sells, Inventor
by Geyer & Popp
Attorneys

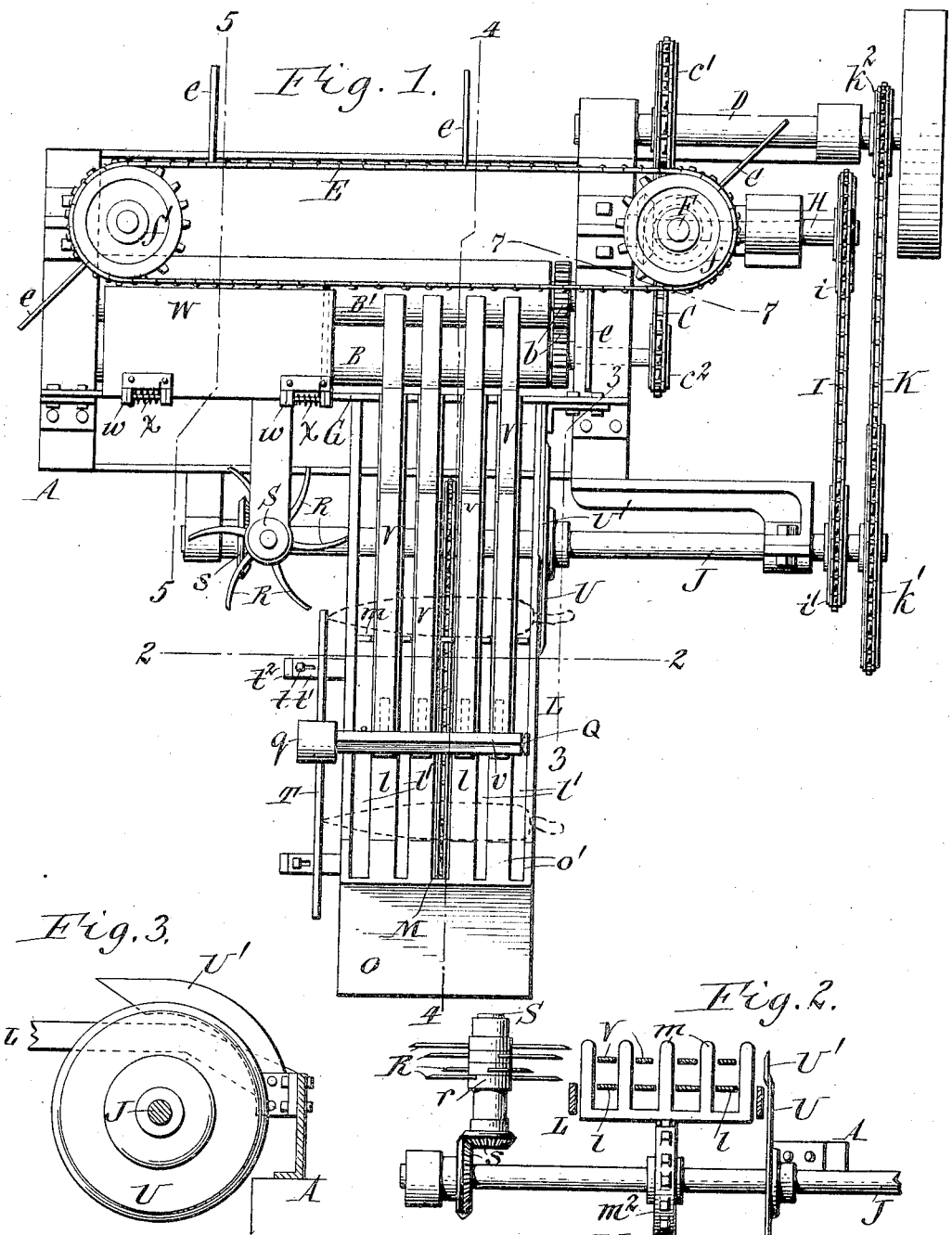

UNITED STATES PATENT OFFICE.

WILLIAM H. SELLS, OF BUFFALO, NEW YORK, ASSIGNOR, BY MESNE ASSIGNMENTS, TO PEERLESS HUSKER COMPANY, OF FREDONIA, NEW YORK.

CORN-HUSKING MACHINE.

No. 890,185.     Specification of Letters Patent.     Patented June 9, 1908.

Application filed January 20, 1906. Serial No. 296,922.

*To all whom it may concern:*

Be it known that I, WILLIAM H. SELLS, a citizen of the United States, residing at Buffalo, in the county of Erie and State of New York, have invented a new and useful Improvement in Corn-Husking Machines, of which the following is a specification.

This invention relates to a machine for removing the husks from green corn preparatory to cutting the kernels from the cob.

The object of this invention is the production of a machine for this purpose which is comparatively simple in construction and can be produced at low cost and which will effectually and expeditiously remove the husks from the corn without bruising the kernels.

In the accompanying drawings consisting of two sheets: Figure 1 is a top plan view of a corn husker embodying my improvements. Fig. 2 is a vertical transverse section of the feeder of the machine taken in line 2—2, Fig. 1 and looking toward the receiving end of the feed table. Figs. 3, 4 and 5 are transverse sections of the machine in the correspondingly numbered lines Fig. 1. Fig. 6 is a vertical longitudinal section on an enlarged scale, taken in the same line as Fig. 2 but looking toward the delivery end of the feed table. Fig. 7 is a fragmentary longitudinal section in line 7—7, Fig. 1, showing part of the machine for driving a delivery belt of the husking rollers.

Similar letters of reference indicate corresponding parts throughout the several views.

In its general organization the machine consists of a device for removing the husks from the corn, devices for shredding the tip end of the corn and trimming off the butt end thereof preparatory to being delivered to the husking device, a feed mechanism whereby the corn is carried past the shredding and trimming devices and delivered to the husking device, and a delivery mechanism operating to move the corn over the husking device and discharge the same from the machine.

A represents the main frame of the machine which may be of any suitable construction to support the various working parts.

The husking device consists of two parallel rollers B $B^1$ which are preferably constructed of rubber and engage each other on their opposing sides. These rollers are preferably journaled horizontally in the main frame and the outer roller $B^1$ is arranged somewhat higher than its companion inner roller B. These rollers are caused to rotate in unison by means of intermeshing gear wheels $b$ secured to the front ends of their shafts and the same are rotated so that their opposing sides move downwardly by means of a chain belt C passing at one end around a sprocket wheel $c^1$ on a main or driving shaft D while its opposite end passes around a sprocket pinion $c^3$ secured to the shaft of the inner husking roller B, as shown in Fig. 1. The ears of the corn to be husked are delivered on top of the husking rollers at the front end thereof and then moved lengthwise of these rollers toward the rear end thereof. During this movement of the corn the husking rollers grasp the husks and pull or strip the same from the ears and discharge the husks downwardly below the rollers while the cob bearing the kernels is discharged from the rear or tail end of the rollers.

The rearward movement of the corn on the husking rollers is preferably effected by means of a delivery belt or conveyer E provided with clearing wings or blades $e$, which latter are adapted to move lengthwise over the husking rollers. The delivery belt passes with its front and rear portions around horizontal supporting wheels $f f^1$ arranged at the receiving and delivery ends of the husking rollers in such a position that the operative portion of the delivery belt is arranged lengthwise and horizontally above the outer elevated husking roller $B^1$. Lengthwise adjacent to the outer side of the inner or lower roller B is arranged a vertical plate G which is rigidly secured to the main frame. This plate and the operative portion of the delivery belt E together form the walls of a longitudinal guide-way or channel whereby the ears of corn are confined against lateral displacement on the husking rollers as the same are moved lengthwise thereof.

The rear supporting wheel $f^1$ of the delivery belt E is mounted on a vertical pin or arbor of the main frame adjacent to the delivery end of the husking rollers while the front wheel $f$ is secured to the upper end of a vertical shaft F which is journaled in any suitable way on the main frame adjacent to the receiving end of the husking rollers. The delivery belt may be operated from the main driving shaft in any suitable manner. The means for this purpose, shown in Figs. 1 to 7 of the drawings, consist of a horizontal shaft H connected at one end by intermeshing bevel gear wheels h with the lower end of the vertical shaft F a chain belt I passing at its opposite ends around sprocket wheels i i¹ secured, respectively, to the opposite end of the horizontal shaft H and a counter shaft J, and a chain belt K passing around a sprocket wheel k¹ on the counter shaft and a counter pinion k² on the driving shaft.

L represents the feed table over which the ears of corn are moved in presenting the same to the shredding and trimming mechanism and delivering the same to the husking rollers. This table is arranged on the same side of the husking rollers as the plate G at the front or receiving ends thereof and the corn is carried from the receiving toward the delivery end of this table in a direction at right angles to the husking rollers. As shown in the drawings this table comprises a plurality of parallel bars l which are separated from each other so as to form intervening slots l¹. The front portions of these table bars are arranged horizontally and at a higher plane than the upper edge of the fixed plate or wall G of the corn guide-way but the rear portions of these bars incline downwardly from the rear end of the horizontal portions and terminate at the upper edge of said wall.

The ears of corn which are to be husked are placed one at a time, preferably by hand, upon the receiving portion of the table in a position crosswise thereof but parallel to the husking rollers, as shown in Fig. 1. The ears are then moved in this position from the receiving to the delivery end of the feed table by means of a plurality of carriers m each of which is preferably constructed in the form of a comb or toothed wing. These wings are secured to a feed belt M arranged below the bars of the feed table and moving with its receiving and delivery portions around vertically rotating supporting wheels m¹ m². As each feed wing moves around the receiving sprocket wheel m¹ from the lower inoperative to the upper operative side of said belt, its teeth are carried upwardly through the slots between the bars of the table and project above the upper side thereof in rear of the place where the ears of corn to be husked are placed upon the feed table. As the wings move forward with the upper operative part of the feed belt it moves lengthwise through the slots between the bars in the feed table and carries the corn resting thereon crosswise from the receiving to the delivery end of the table. When the corn reaches the delivery end of the table the wing engaging therewith is withdrawn therefrom by the feed chain passing downwardly around the delivery sprocket wheel m² to the lower inoperative side of the belt.

The receiving sprocket wheel m¹ is secured to a horizontal shaft n which is journaled on the adjacent part of the main frame while the delivery sprocket wheel m² is secured to the adjacent part of the counter shaft J. In order to enable the operator to place the corn with facility in the proper position on the receiving part of the feed table a guide is provided which preferably consists of an inclined guide plate o arranged transversely above the receiving portion of the feed table and secured at its depressed front or outer end to said table and a plurality of inclined guide bars o¹ extending from the elevated rear end of the guide plate downwardly and rearwardly to the horizontal bars of the feed table, as shown in Figs. 1, 4 and 6. The operator places the ears of corn successively upon the table and against the guide bars in which position they will be properly engaged by the teeth of the feed wings which move through the space between the guide bars.

In order to prevent the ears of corn from accidentally rolling forward to an undesirable extent and becoming displaced on the table after being depressed thereon by the operator a detent device is provided which preferably consists of a rock shaft P arranged horizontally and transversely above the feed table in front of the guide bars o¹ and provided with a plurality of forwardly and downwardly inclined fingers p which are yieldingly held in engagement with the upper side of the table bars by means of a spring p¹. This shaft is hollow and journaled on a horizontal rod Q which is secured at one end to a bracket or standard q rising from the adjacent part of the main frame. As the corn is moved forward by the feed wings the same engages the detent fingers and the latter are deflected until the corn clears the same after which these fingers again resume their normal depressed position.

After the corn passes the detent fingers the tip and butt ends thereof are presented to devices which operate to brush out or shred the tip of the corn and trim or cut off the surplus of the butt or stub preparatory to removing the husk from the corn. The ears of corn are preferably placed upon the feed table with the tip end at the left side of the table and the butt or stub end at the right side of the table and the shredding and trimming devices are arranged adjacent to the corresponding sides of the table, as shown in the drawings, but this arrangement, if desired, may be reversed.

The preferred construction of the shredding devices is constructed as follows: R represents a plurality of cutters or blades which are arranged circumferentially and at different heights around a horizontally rotating hub r and are adapted to sweep through the path of the tip end of the corn on one side of said hub. These cutters are sufficient in number and are rotated at a sufficiently high speed that the husks at the tip end of the corn upon passing the same are shredded finely or brushed out so as to thoroughly loosen up the interwoven husks at this end of the corn and free them from the kernels inclosed thereby.

The cutters are preferably rotated so that they move in a direction opposite to that of the corn upon engaging the latter, thereby increasing the effectiveness of the shredding blades and avoiding displacement of the corn while being operated upon. The shredding blades are preferably curved in the direction in which they rotate so that they cut with a drawing action and thus facilitate the shredding of the husks. The hub of the shredding blades is secured to the upper end of a vertical shaft S which is journaled in bearings on the adjacent part of the main frame and is rotated by intermeshing bevel gears s secured respectively to the counter shaft and the lower end of the vertical shaft S, as shown in Fig. 2.

In order to enable the operator to place the corn in position on the feed table so as to be properly engaged by the shredding blades a gage or bar T is arranged lengthwise along the left side of the feed table and projects above the top of the same. The operator in placing the corn upon the table moves the tip thereof against the gage and as the corn is carried forwardly by the feed wings the tip thereof is moved through the path of the shredding blades. For permitting variation in the extent of the shredding operation on the tip of the corn according to the character of the corn or other conditions, this gage is made adjustable laterally relatively to the feed table by means of adjusting screws $t$ passing through slotted lugs $t^1$ on the gage brackets $t^2$ on the main frame, as shown in the drawings, or by any other suitable means.

At the same time that the tip of the corn is being shredded the stub or butt end thereof is trimmed off so as to reduce the corn to a maximum length before reaching the husking rollers, thereby reducing the wear upon said rollers which would be caused by leaving an unduly long stub on the corn. The preferred form of trimming device for this purpose which is shown in Figs. 1, 2 and 3 of the drawings consists of a rotary lower cutter or disk U and an upper stationary cutter or blade $U^1$ arranged along side of the upper part of the lower cutter. The edge of the upper cutter is preferably inclined tangentially relatively to the low cutter and the latter is so rotated that its upper operative portion moves toward the edge of the upper cutter. The operative portions of these two cutters are so arranged that the butt or stub end of the corn is in line with the forwardly converging surfaces of these cutters and is trimmed off thereby in passing between the same. The lower rotary cutter is driven by the counter shaft J upon which it is mounted and the upper cutter is secured to the adjacent part of the main frame. The shredding and trimming devices are arranged adjacent to the rear end of the horizontal portion of the feed table at which point the feed wings still have full control of the corn and move the same past the shredding and trimming devices. After the corn has been thus shredded and trimmed at opposite ends the feed wings move the same down the inclined rear portion of the feed table and upon the husking rollers, during which operation the wings are withdrawn from the corn below the table. The delivery of the corn from the inclined portion of the table to the husking rollers is due partly to the impetus given to the same by the feed wings aided by gravity. This delivery of the corn is effected transversely from the feed table through the top of the guide-way of the husking rollers at the receiving end thereof which permits both walls of this guide-way to be extended the full length of the husking rollers thereby insuring the retention of the corn in a parallel position relatively to the husking rollers throughout the entire length thereof. This would not be possible if the corn were delivered sidewise upon the husking rollers at substantially the same level inasmuch as this would necessitate the removal of a portion of the wall G at the receiving end thereof to permit of the passage of the corn, forming an abrupt edge against which the corn would be liable to engage and become bruised thereby reducing the quality of the product, and the corn is also liable to be caught thereby clogging the machine and incurring a loss of time.

Owing to the thorough loosening up or separation of the husks at the tip of the corn by means of the shredding device the husking rollers are enabled to obtain a firm grip upon the individual leaves of the husks and remove the same from the ear successively and thoroughly. This is not possible in attempting to remove the husks by rollers when the tips of the husks are unshredded because the entire tip is liable to be drawn in between the rollers at one time causing an undue strain on the rollers and possible clogging of the same inasmuch as by this operation part of the husks are drawn from one side of the corn to the other over the tip and broken instead of being stripped off clean. Aside from being difficult to husk ears of corn having their tips unshredded the same are liable to have their kernels near the tip bruised or broken by the lateral pressure to which they are subjected when the tip is grasped by the husking rollers and pulled or broken off sidewise across the tip end of the corn.

In order to prevent displacement of the corn while moving over the delivery portion of the feed table and the receiving portion of the husking rollers a retaining device is provided consisting preferably of a plurality of parallel spring bars V which are arranged lengthwise over the bars of the feed table and transversely over the receiving portions of the husking rollers. Each of these bars consists of an inclined center or intermediate portion which is substantially parallel with the inclined rear portion of the table, an upwardly curved front portion which is secured at its front end to a transverse bar r on the standard q and a horizontal rear portion projecting over the front part of the rollers. As the corn is carried forward by the feed wings into engagement with the retaining bars V the latter are shifted from the position shown in full lines to the position shown by dotted lines in Fig. 4 and exert a yielding pressure on the corn, whereby the same is reliably held in position on the feed table while being operated upon. As the corn clears the feed table and the retaining bars the latter resume their normal depressed position so as to form a closure above the receiving portion of the husking rollers and prevent the corn from tipping up unduly at one end while the husks are being removed therefrom.

For the purpose of confining the ears of corn upon the delivery portion of the husking rollers the top of the guide-way adjacent to this portion of the rollers is covered by means of a horizontal cover or plate W. This plate is preferably connected with the upper edge of the fixed side wall G by hinges w which permit the cover to swing vertically and horizontally and the same is held in its normal horizontal position by means of springs X, whereby this cover is enabled to yield when engaged by a tipping ear of corn and the kernals thereof are prevented from being bruised. In pulling or stripping the husks from the ears of corn nearly all of the silks are also removed at the same time.

My improved husking machine in addition to removing the husks and silks thoroughly from the ears of corn effects this operation expeditiously and without liability of clogging the machine, thereby enabling the machine to be run without interruption and increasing the output thereof accordingly.

I claim as my invention:

1. A corn husking machine comprising a pair of coöperating husking rollers, a feed table arranged on one side of said rollers and composed of longitudinal bars which are separated by intervening slots, a feed belt provided with teeth movable through said slots and operating to move the corn lengthwise thereon to said rollers and in a position parallel with the latter, and a stationary guide or abutment having inclined bars arranged above the receiving portion of said table, substantially as set forth.

2. A corn husking machine comprising a pair of coöperating husking rollers, a feed table arranged on one side of the husking rollers and composed of a plurality of bars, a feed belt having teeth projecting through spaces between said bars and adapted to propel the ears of corn to the husking rollers in a position parallel thereto, and a guide composed of a plate arranged above the receiving portion of said table and inclined bars extending from the rear end of said plate downwardly and forwardly to the bars of the table, substantially as set forth.

3. A corn husking machine comprising a shredding device which is constructed and operates to loosen up the husks of the ear of corn at the tip end thereof, and means for carrying the corn laterally with its end past said shredding device, substantially as set forth.

4. A corn husking machine comprising a carrier constructed and operating to carry the ears of corn laterally, and a shredding device arranged in the path of the tips of the ears of corn and having a plurality of members which are adapted to engage with said tips and shred them, substantially as set forth.

5. A corn husking machine having means operating to shred the husks at the tip end of the corn, means operating to strip the husks from the corn, a feed device whereby the corn is moved past said means which shred the husks and to said means which strip the husks, and a delivery device whereby the corn is moved past said means which strip the husks and discharge the same therefrom, substantially as set forth.

6. A corn husking machine having means for shredding the husk at the tip end of the corn, means operating to cut off the butt ends, means operating to strip the husks from the corn, a feeding device whereby the corn is moved laterally past said means which shred the husks, cut off the butts and to said means which strip the husks, and a delivery device whereby the corn is moved past said means which strip the husks and discharged therefrom, substantially as set forth.

7. A corn husking machine comprising a feed table, a feed device operating to move the corn in a crosswise position along said table, and a shredding member arranged on one side of the table and operating to shred the tip end of the husks of the corn, substantially as set forth.

8. A corn husking machine comprising a feed table, a feed device operating to move the corn in a crosswise position along said table, and a shredding member arranged on one side of the table and operating to shred the tip end of the husks of the corn and having rotating parts which move through the path of the tip end of the corn, substantially as set forth.

9. A corn husking machine comprising a feed table, a feed device operating to move the corn in a crosswise position along said table, and a shredding member arranged on one side of the table and operating to shred the tip end of the husks of the corn and consisting of a plurality of cutter blades moving through the path of the tip of the corn and mounted on the periphery of a rotary hub, substantially as set forth.

10. A corn husking machine comprising a feed table, a feed device operating to move the corn in a crosswise position along said table, and a trimming device for trimming off the butt end of the corn arranged on one side of said table and consisting of two coöperating blades which receive the corn between them and which meet above the upper side of the table, substantially as set forth.

11. A corn husking machine comprising a feed table, a feed device operating to move the corn in a crosswise position along said table, and a trimming device for trimming off the butt end of the corn arranged on one side of said table and consisting of a coöperating lower rotary disk-shaped blade and an upper stationary blade having its edge inclining tangentially relatively to said rotary blade, substantially as set forth.

12. A corn husking machine comprising a feed table, a feed device for moving the corn in a crosswise position along said table, a shredding device arranged on one side of said table and operating to shred the tip end of the corn but not cut the same, and a trimming device arranged on the opposite side of said table and operating to cut off the butt end of the corn, substantially as set forth.

13. A corn husking machine comprising a pair of coöperating husking rollers, a feed table arranged on one side of said rollers, a feed device operating to move the corn from said table to said rollers, and—corn retaining springs having their front portions arranged over the feed table and their rear portions arranged over the husking rollers, substantially as set forth.

14. A corn husking machine comprising a pair of coöperating husking rollers, a feed table arranged on one side of said rollers and having a receiving portion which is arranged horizontally and a delivery portion which inclines from said horizontal portion downwardly to said husking rollers, and corn retaining springs each of which has an inclined intermediate portion above the inclined part of said table, an upwardly curved front part which is secured to a fixed support and a horizontal rear part which extends over the husking rollers, substantially as set forth.

15. A corn husking machine comprising a pair of coöperating husking rollers, guide walls arranged lengthwise on opposite sides of said rollers, a cover arranged over said rollers and pivoted on an axis arranged parallel to the rollers, and a spring which yieldingly holds said cover in a depressed position, substantially as set forth.

16. A corn husking machine comprising a pair of coöperating husking rollers, means for moving the corn lengthwise of said rollers, a feed table arranged on one side of said rollers, a feed device operating to move the corn from said table to the receiving end of said rollers, retaining springs arranged lengthwise over said table and transversely over the receiving end of said rollers, and a cover arranged over the delivery end of said rollers, substantially as set forth.

Witness my hand this 11th day of Oct., 1905.

WILLIAM H. SELLS.

Witnesses:
GEO. M. MISNER,
THEO. L. POPP.